(12) United States Patent
Yeom et al.

(10) Patent No.: US 7,929,096 B2
(45) Date of Patent: Apr. 19, 2011

(54) LIQUID CRYSTAL DISPLAY

(75) Inventors: Joo-seok Yeom, Gwacheon-si (KR);
Kyu-wan Ryu, Seoul (KR)

(73) Assignee: Samsung Electronics Co., Ltd.,
Suwon-si (KR)

( * ) Notice: Subject to any disclaimer, the term of this patent is extended or adjusted under 35 U.S.C. 154(b) by 226 days.

(21) Appl. No.: 12/274,875

(22) Filed: Nov. 20, 2008

(65) Prior Publication Data
US 2009/0147162 A1 Jun. 11, 2009

(30) Foreign Application Priority Data

Dec. 7, 2007 (KR) ........................ 10-2007-0127065

(51) Int. Cl.
*G02F 1/1343* (2006.01)
(52) U.S. Cl. ........................................ 349/139; 349/146
(58) Field of Classification Search .................. 349/139, 349/143, 144, 146
See application file for complete search history.

(56) References Cited

U.S. PATENT DOCUMENTS

| | | | | |
|---|---|---|---|---|
| 5,418,635 | A * | 5/1995 | Mitsui et al. | 349/113 |
| 6,441,878 | B1 * | 8/2002 | Wong | 349/143 |
| 2002/0076845 | A1 * | 6/2002 | Noritake et al. | 438/30 |
| 2009/0207359 | A1 * | 8/2009 | Shin et al. | 349/129 |

FOREIGN PATENT DOCUMENTS

| | | |
|---|---|---|
| JP | 08262445 | 10/1996 |
| JP | 2006337697 | 12/2006 |
| KR | 1020050070380 | 7/2005 |

* cited by examiner

*Primary Examiner* — Sarah Hahm
(74) *Attorney, Agent, or Firm* — H.C. Park & Associates, PLC

(57) ABSTRACT

A liquid crystal display includes a first insulating substrate, pixel electrodes disposed on the first insulating substrate and divided into a plurality of domains, each domain including micro-concave stripes and micro-convex stripes arranged in a specific direction, a second insulating substrate facing the first insulating substrate, a common electrode, which is not patterned, disposed on the second insulating substrate, and a liquid crystal layer interposed between the first and second insulating substrates and including liquid crystal molecules. The liquid crystal molecules are aligned perpendicular to the first and second insulating substrates when an electric field is not applied to the liquid crystal layer, and the liquid crystal molecules are inclined in an extension direction of the micro-concave stripes and the micro-convex stripes when an electric field is applied to the liquid crystal layer.

20 Claims, 14 Drawing Sheets

LIQUID CRYSTAL DISPLAY

CROSS REFERENCE TO RELATED APPLICATION

This application claims priority from and the benefit of Korean Patent Application No. 10-2007-0127065, filed on Dec. 7, 2007, which is hereby incorporated by reference for all purposes as if fully set forth herein.

BACKGROUND OF THE INVENTION

1. Field of the Invention

The present invention relates to a display and more particularly, to a liquid crystal display.

2. Discussion of the Background

Liquid crystal displays are widely used flat panel displays. A liquid crystal display includes two display panels on which field-generating electrodes, such as pixel electrodes and a common electrode, are disposed, and a liquid crystal layer that is disposed between the panels. In the liquid crystal display, voltages are applied to the field-generating electrodes to generate an electric field in the liquid crystal layer. The alignment of liquid crystal molecules of the liquid crystal layer is determined by the electric field, and the polarization of incident light is controlled, so that images are displayed.

Among liquid crystal displays, vertical alignment (VA) mode liquid crystal displays have been focused on recently because they have high contrast ratios and wide viewing angles, in which major axes of liquid crystal molecules are perpendicular to the upper and lower display panels when no electric field is applied. In order to achieve a wide viewing angle in such a liquid crystal display, gaps may be formed in a field-generating electrode, or protrusions may be formed above or below the field-generating electrode.

Patterned Vertical Alignment (PVA) mode liquid crystal displays and patternless VA mode liquid crystal displays have gaps. In the PVA mode liquid crystal display, gaps are formed on both upper and lower substrates. In the patternless VA mode liquid crystal display, micro-patterns are formed on a lower substrate, but not on an upper substrate.

In the case of a liquid crystal display having a large area, since the size of a pixel is increased, it may be difficult to effectively control the movement of the liquid crystal molecules and therefore the directionality of liquid crystal molecules may be unstable. As a result, the response speed may be decreased.

SUMMARY OF THE INVENTION

The present invention provides a liquid crystal display that may simultaneously improve response speed and luminance.

Additional features of the invention will be set forth in the description which follows, and in part will be apparent from the description, or may be learned by practice of the invention.

The present invention discloses a liquid crystal display including a first insulating substrate, pixel electrodes disposed on the first insulating substrate and divided into a plurality of domains, each domain including micro-concave stripes and micro-convex stripes arranged in a specific direction, a second insulating substrate facing the first insulating substrate, a common electrode, which is not patterned, disposed on the second insulating substrate, and a liquid crystal layer disposed between the first and second insulating substrates and including liquid crystal molecules. The liquid crystal molecules are aligned perpendicular to the first and second insulating substrates when an electric field is not applied to the liquid crystal layer, and the liquid crystal molecules are inclined in an extension direction of the micro-concave stripes and the micro-convex stripes when an electric field is applied to the liquid crystal layer.

The present invention also discloses a liquid crystal display including a first insulating substrate, pixel electrodes disposed on the first insulating substrate, having a bent structure, and including micro-concave stripes and micro-convex stripes that extend along edges of the pixel electrode to be orthogonal to the edges of the pixel electrode, a second insulating substrate facing the first insulating substrate, a common electrode disposed on the second insulating substrate and including a domain-dividing portion, and a liquid crystal layer disposed between the first and second insulating substrates and including liquid crystal molecules. The liquid crystal molecules are aligned perpendicular to the first and second insulating substrates when an electric field is not applied to the liquid crystal layer, and the liquid crystal molecules are inclined in an extension direction of the micro-concave stripes and the micro-convex stripes when an electric field is applied to the liquid crystal layer.

The present invention also discloses a liquid crystal display including a first insulating substrate, pixel electrodes disposed on the first insulating substrate, having a bent structure, and including micro-concave stripes and micro-convex stripes that extend along edges of the pixel electrode to be orthogonal to the edges of the pixel electrode, control electrodes overlapping with cut-out portions in the pixel electrodes, the control electrodes receiving a voltage higher than that applied to the pixel electrodes, a second insulating substrate facing the first insulating substrate, a common electrode, which is not patterned, disposed on the second insulating substrate, and a liquid crystal layer disposed between the first and second insulating substrates and including liquid crystal molecules. The liquid crystal molecules are aligned perpendicular to the first and second insulating substrates when an electric field is not applied to the liquid crystal layer, and the liquid crystal molecules are inclined in an extension direction of the micro-concave stripes and the micro-convex stripes when an electric field is applied to the liquid crystal layer.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
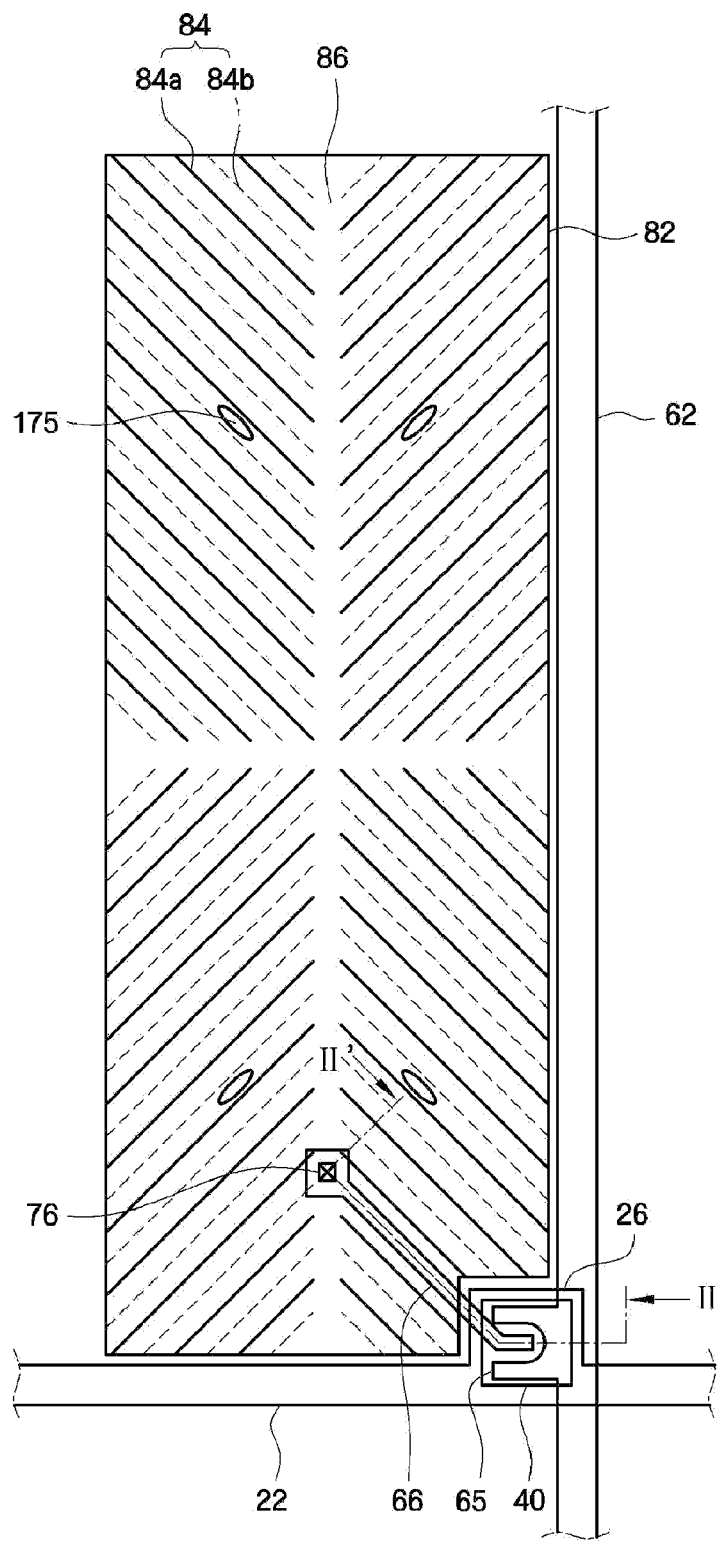
FIG. 1 is a layout of a liquid crystal display according to a first exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements It will be understood that when an element or layer is referred to as being "on", "connected to," or "coupled to" another element or layer, it can be directly on, connected, or coupled to the other element or layer or intervening elements or layers may be present. In contrast, when an element is referred to as being "directly on", "directly connected to," or "directly coupled to" another element or layer, there are no intervening elements or layers present. As used herein, the term "and/or" includes any and all combinations of one or more of the associated listed items.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures.

Embodiments described herein will be described referring to plan views and/or cross-sectional views by way of ideal schematic views of the invention. Accordingly, the exemplary views may be modified depending on manufacturing technologies and/or tolerances. Therefore, the embodiments of the invention are not limited to those shown in the views, but include modifications in configuration formed on the basis of manufacturing processes. Therefore, regions exemplified in figures have schematic properties and shapes of regions shown in figures exemplify specific shapes of regions of elements and not limit aspects of the invention.

Figure 2:
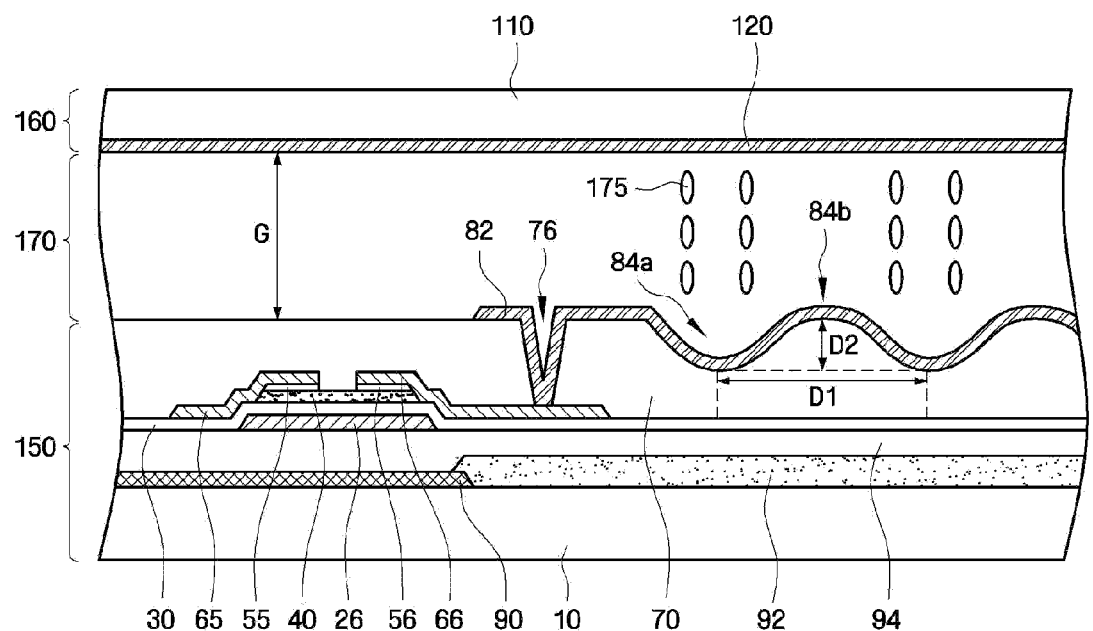
FIG. 2 is a cross-sectional view of the liquid crystal display taken along line II-II' of FIG. 1.
Figure 3:
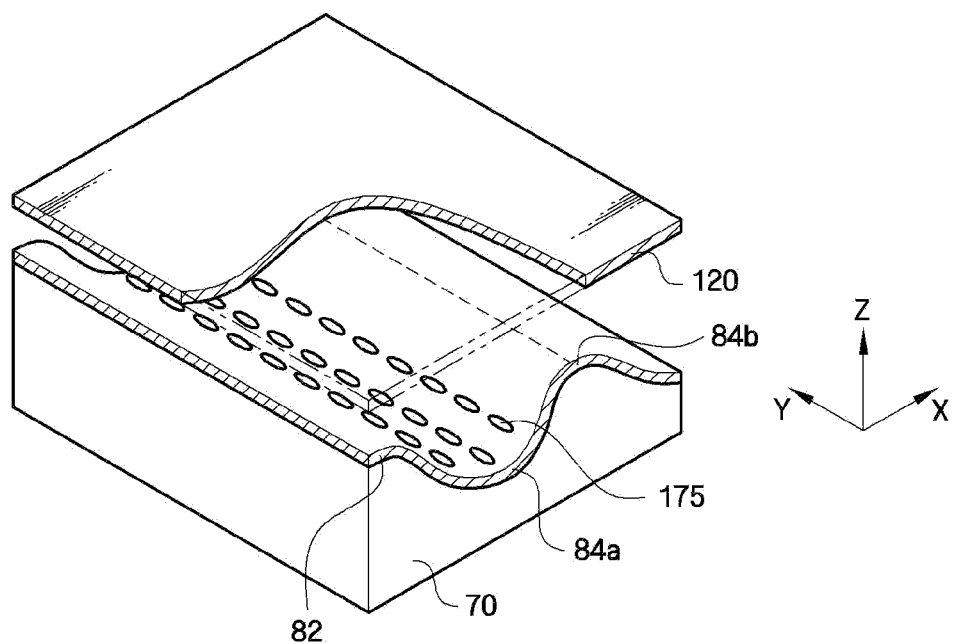
FIG. 3 is a partially sectioned perspective view of the liquid crystal display shown in FIG. 1.

A liquid crystal display according to a first exemplary embodiment of the present invention will be described below with reference to FIG. 1, FIG. 2, and FIG. 3. FIG. 1 is a layout of a liquid crystal display according to a first exemplary embodiment of the present invention. FIG. 2 is a cross-sectional view of the liquid crystal display taken along line II-II' of FIG. 1. FIG. 3 is a partially sectioned perspective view of the liquid crystal display shown in FIG. 1.

Referring to FIG. 1 and FIG. 2, the liquid crystal display according to the first exemplary embodiment of the present invention includes a lower display panel 150, an upper display panel 160, and a liquid crystal layer 170. The lower display panel 150 includes thin film transistors that are connected to gate lines 22 and data lines 62 and that apply data voltages to pixel electrodes 82. The upper display panel 160 faces the lower display panel 150, and includes a common electrode 120. The liquid crystal layer 170 is interposed between the lower display panel 150 and the upper display panel 160. According to the present exemplary embodiment, color filters 92 and a thin film transistor array are disposed on the lower display panel 150. The present exemplary embodiment is described by using an Array On Color filter (AOC) structure where the thin film transistor array is disposed on the color filters 92. However, the present invention is not limited thereto. That is, exemplary embodiments of the present invention also may employ Color filter On Array (COA) structure where color filters and a thin film transistor array are disposed on a lower display panel and the color filters are disposed on the thin film transistor array. In this case, the color filter may be used as a passivation layer that is provided between the thin film transistor array and pixel electrodes. Furthermore, the color filters may be disposed on the upper display panel 160. For explanatory convenience, exemplary embodiments of the present invention will be described below by using a liquid crystal display having the AOC structure.

The lower display panel 150 is described in detail below.

Black matrices 90, which prevent light from leaking and define pixel regions, are disposed on a first insulating substrate 10 that may be made of a transparent insulating material, such as glass. Each black matrix 90 may be made of a metal or a metal oxide, such as chromium or chromium oxide, or an organic black resist.

Red, green, and blue color filters 92 are sequentially arranged on the pixel region between the black matrices 90.

An overcoat layer 94, which planarizes the color filters 92 and the black matrices 90, may be disposed on the color filters 92.

The gate line 22 is disposed on the overcoat layer 94 in a first direction, for example, in a horizontal direction. A gate electrode 26 extends from the gate line 22. The gate line 22 and the gate electrode 26 are referred to as gate wires.

A storage line (not shown) is disposed on the overcoat layer 94 in the horizontal direction. The storage line (not shown) overlaps the pixel electrode 82 to form a storage capacitor. The shape and arrangement of the storage line (not shown) may be modified in various ways. A common voltage Vcom may be applied to the storage line (not shown).

Each gate wire 22 and 26 and the storage line (not shown) may be made of an aluminum-based metal, such as aluminum (Al) or an aluminum alloy, a silver-based metal, such as silver (Ag) or a silver alloy, a copper-based metal, such as copper (Cu) or a copper alloy, a molybdenum-based metal, such as molybdenum (Mo) or a molybdenum alloy, chromium (Cr), titanium (Ti), or tantalum (Ta). In addition, each gate wire 22 and 26 and the storage line (not shown) may have a multilayer structure that includes two conductive films (not shown) having different physical properties. One of the two conductive films may be made of a metal having low resistivity, for example, an aluminum-based metal, a silver-based metal, or a copper-based metal, to reduce signal delay or voltage drop in each of the gate wires 22 and 26 and the storage line (not shown). The other conductive film may be made of a material having excellent contact characteristics with respect to indium tin oxide (ITO) and indium zinc oxide (IZO), for example, a molybdenum-based metal, chromium, titanium, or tantalum. A structure that has a chromium lower film and an aluminum upper film, and a structure that has an aluminum lower film and a molybdenum upper film may be used as an example of the combination of the two conductive films. However, each gate wire 22 and 26 and the storage line (not shown) may be made of various metallic materials or conductors other than the above metallic materials.

A gate insulating film 30, which may be made of silicon nitride ($SiN_x$) or the like, is disposed on the gate wires 22 and 26 and the storage line (not shown).

A semiconductor layer 40, which may be made of hydrogenated amorphous silicon or polysilicon, is disposed on the gate insulating film 30. The semiconductor layer 40 may have various shapes, such as an island shape or a stripe shape. For example, like in this exemplary embodiment, the semiconductor layer 40 may be disposed on the gate electrode 26 and may have an island shape. Further, the semiconductor layer may be provided below the data line 62 and may extend to the upper portion of the gate electrode 26 in a stripe shape. If the semiconductor layer has a stripe shape, the semiconductor layer may be formed by substantially the same patterning process as the data line 62.

Ohmic contact layers 55 and 56 are disposed on the semiconductor layer 40, and may be made of silicide or n+ hydrogenated amorphous silicon in which n-type impurities are doped at high concentration. Each ohmic contact layer 55 and 56 may have any of various shapes, such as an island shape or stripe shape. For example, when each ohmic contact layer 55 and 56 has an island shape like in the present exemplary embodiment, the ohmic contact layers 55 and 56 may be provided below a drain electrode 66 and a source electrode 65. When each ohmic contact layer has a stripe shape, the ohmic contact layers 55 and 56 may extend to the lower portion of the data line 62.

The data line 62, the source electrode 65, and the drain electrode 66 are disposed on the ohmic contact layers 55 and 56 and the gate insulating layer 30. The data line 62 extends in a second direction, for example, in a vertical direction, and crosses the gate line 22 to define a pixel. The source electrode 65 extends from the data line 62 to the upper portion of the semiconductor layer 40 in a branch shape. The drain electrode 66 is spaced apart from the source electrode 65 and is provided above the semiconductor layer 40 to face the source electrode 65 with the gate electrode 26 therebetween. The thin film transistor is a three-terminal element that includes the gate electrode 26, the source electrode 65, and the drain electrode 66. Further, the thin film transistor is a switching element that allows current to flow between the source electrode 65 and the drain electrode 66 when a voltage is applied to the gate electrode 26.

The drain electrode 66 includes a bar-shaped pattern, which is provided above the semiconductor layer 40, and an extension portion. The extension portion extends from the bar-shaped pattern to form a wide area, a portion of which is exposed by a contact hole 76.

The data line 62, the source electrode 65, and the drain electrode 66 are referred to as data wires.

Each data wire 62, 65, and 66 may be a single film or a multilayer film that is made of one or more of aluminum, chromium, molybdenum, tantalum, and titanium. For example, each data wire 62, 65, and 66 may made of a refractory metal, such as chromium, molybdenum-based metal, tantalum, or titanium. Further, each data wire 62, 65, and 66 may have a multilayer structure in which an upper film (not shown) made of a low-resistance material is disposed on a lower film (not shown) made of a refractory metal or the like. A three-layer structure that has a molybdenum film, an aluminum film, and a molybdenum film may be used as an example of the multilayer structure other than the above-mentioned dual-layer structures that have a chromium lower film and an aluminum upper film, or the above mentioned dual-layer structure that has an aluminum lower film and a molybdenum upper film.

At least a part of the source electrode 65 overlaps the semiconductor layer 40. Further, the drain electrode 66 faces the source electrode 65 with the gate electrode 26 therebetween, and at least a part of the drain electrode 66 overlaps the semiconductor layer 40. In this case, the ohmic contact layers 55 and 56 are disposed between the semiconductor layer 40 and the source electrode 65, and between the semiconductor layer 40 and the drain electrode 66, respectively, to reduce the contact resistance therebetween.

A passivation layer 70, which may be made of an insulating film, is disposed on the data wires 62, 65, and 66 and the semiconductor layer 40 exposed through the data wires. In this case, the passivation layer 70 may be made of an inorganic material such as silicon nitride or silicon oxide, an organic material that has a good planarizing characteristics and photosensitivity, or an insulating material having a low dielectric constant, such as a-Si:C:O or a-Si:O:F, that is formed by plasma enhanced chemical vapor deposition (PECVD). In addition, the passivation layer 70 may have a dual-layer structure, which includes a lower inorganic layer and an upper organic layer, to improve characteristics of the organic film and to protect the exposed semiconductor layer 40. In addition, red, green, and blue color filter layers may be used as the passivation layer 70.

The contact hole 76, which exposes the drain electrode 66, is formed in the passivation layer 70.

Micro-concave and convex portions are formed on the passivation layer 70 by a mask that has patterns formed in a slit or lattice shape, or a mask having a translucent film.

The pixel electrode 82, which is connected to the drain electrode 66 through the contact hole 76, is disposed on the passivation layer 70 to correspond to the shape of the pixel. The pixel electrode 82, to which a data voltage is applied, generates an electric field together with the common electrode 120 of the upper display panel 160, thereby determining the alignment of the liquid crystal molecules 175 that are provided between the pixel electrode 82 and the common electrode 120. In this case, the pixel electrode 82 may be made of a transparent electric conductor such as ITO or IZO, or a reflective electric conductor such as aluminum.

The pixel electrode 82 includes micro-concave and convex stripes 84 that correspond to the micro-concave and convex portions disposed on the passivation layer 70. Specifically, the pixel electrode 82 includes a cross-shaped connection portion 86 and the micro-concave and convex stripes 84. The cross-shaped connection portion 86 divides a pixel region into four domain regions, and the micro-concave and convex stripes 84 are arranged in a specific direction in each domain. In this case, a domain is a region including a group of liquid crystal molecules 175 that are inclined in a specific direction due to an electric field generated between the pixel electrode 82 and the common electrode 120. Further, the micro-concave and convex stripes 84 have a structure in which micro-concave portions 84a and micro-convex portions 84b are alternately arranged.

The micro-concave and convex stripes 84 are arranged in a diagonal direction, and extend at an angle of about 45° or −45° with respect to a polarization axis of a polarizer (not shown) or the gate line 22. When driving power is applied to the liquid crystal display, the liquid crystal molecules 175 are inclined in an extension direction of the micro-concave and convex stripes 84. Accordingly, the pixel region is divided into four domain regions.

A capping layer (not shown) may further be disposed between the passivation layer 70 and the pixel electrode 82. In this case, the capping layer functions to separate the pixel electrode 82 from the passivation layer 70. For example, silicon nitride ($SiN_x$) may be used as a material of the capping layer.

An alignment film (not shown) to align the liquid crystal molecules 175 may be disposed on the pixel electrode 82.

The upper display panel 160 facing the lower display panel 150 is described in detail below.

A second insulating substrate 110, which may be made of a transparent insulating material such as glass, is disposed to face the first insulating substrate 10. The common electrode 120, which may be made of a transparent conductive material such as ITO or IZO, is disposed on the second insulating substrate 110. An alignment layer (not shown) to align the liquid crystal molecules 175 may be disposed on the common electrode 120. Since a separate patterning process is not added for the common electrode 120, it may be possible to improve the transmittance of the liquid crystal display and to reduce the manufacturing costs.

The lower display panel 150 and the upper display panel 160 are aligned and combined with each other as described above and the liquid crystal layer 170 is disposed between the panels in the basic structure of the liquid crystal display according to the first exemplary embodiment of the present invention. The liquid crystal display is obtained by disposing elements, such as polarizers and a backlight, on the basic structure. In this case, the polarizers are disposed on both sides of the basic structure, respectively. The polarization axis of one polarizer may be parallel to the gate line 22, and the polarization axis of the other polarizer may be orthogonal to the gate line.

When the electric field is not applied between the pixel electrodes 82 and the common electrode 120, the liquid crystal molecules 175 included in the liquid crystal layer 170 are aligned so that directors of the liquid crystal molecules are perpendicular to the lower display panel 150 and the upper display panel 160. Further, the liquid crystal molecules 175 may have negative dielectric anisotropy.

The movement of the liquid crystal molecules 175 of the liquid crystal display according to the present exemplary embodiment of the invention will be described below with reference to FIG. 2 and FIG. 3.

Referring to FIG. 2, the pitch D1 of the micro-concave and convex stripes 84 should be as small as possible, for example, it may be 2.5 times the cell gap G between the lower display panel 150 and the upper display panel 160 or less, in order to effectively control the movement of the liquid crystal molecules 175. In this case, the pitch D1 of the micro-concave and convex stripes 84 is a gap between adjacent micro-concave portions 84a or a gap between adjacent micro-convex portions 84b. For example, if the cell gap G is in the range of 3 μm to 4 μm, the pitch D1 of the micro-concave and convex stripes 84 may be in the range of 7.5 μm to 10 μm. In addition, if the pitch D1 is 2 μm or more, it may be possible to obtain a horizontal electric field that can control the movement of the liquid crystal molecules 175. Further, the height difference D2 of the micro-concave and convex stripes 84, that is, the difference in height between the micro-concave portion 84a and the micro-convex portion 84b may be 0.5 to 1 times the pitch D1. If the height difference D2 is larger than the pitch D1, the surface of the pixel electrode 82 would be excessively uneven. For this reason, it may be difficult to obtain uniform characteristics of a display. If the height difference D2 is smaller than 0.5 times the pitch D1, the intensity of the electric field generated by the micro-concave and convex stripes 84 is small. For this reason, it may be difficult to accurately control the movement direction of the liquid crystal molecules 175.

When an electric field is not applied between the pixel electrode 82 and the common electrode 120, the liquid crystal molecules 175 are aligned in the Z-direction.

If an electric field is applied between the pixel electrode 82 and the common electrode 120, a horizontal electric field and a vertical electric field are generated between the pixel electrodes 82 and the common electrode 120 by the micro-concave and convex stripes 84. Accordingly, the liquid crystal molecules 175 are initially rotated in the X-Z plane to be aligned parallel to the inclined surfaces of the micro-concave and convex stripes 84. Subsequently, the liquid crystal molecules 175 are arranged in the extension direction of the micro-concave and convex stripes 84, that is, in the Y-direction due to the interference with peripheral liquid crystal molecules 175, as shown in FIG. 3.

Figure 4A:
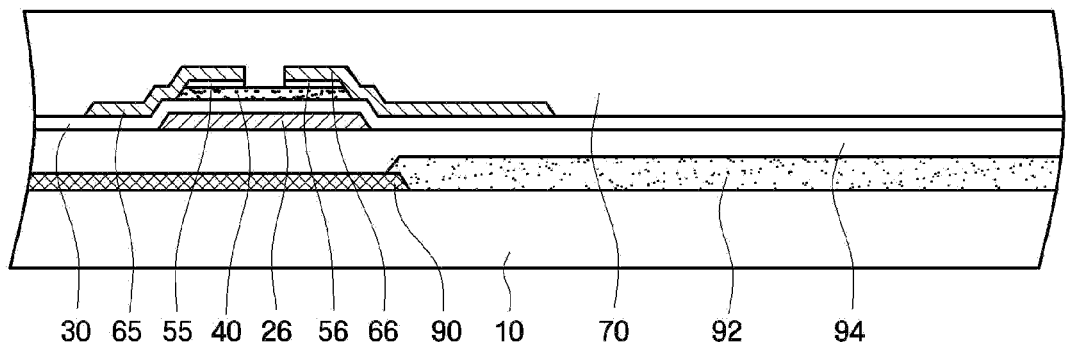
FIG. 4A, FIG. 4B, and FIG. 4C are cross-sectional views showing processes of a method of manufacturing the liquid crystal display according to the first exemplary embodiment of the present invention.
Figure 4B:
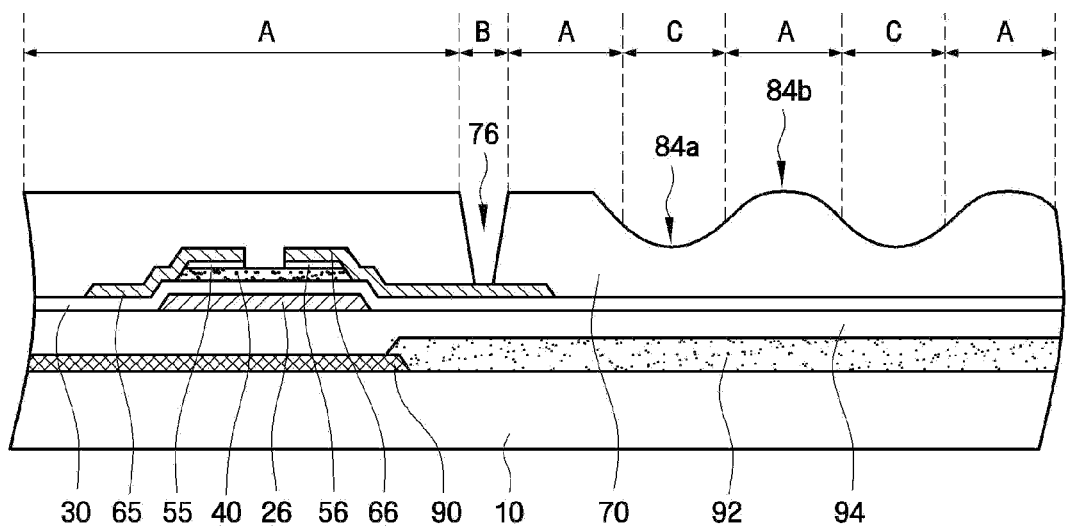
Figure 4C:
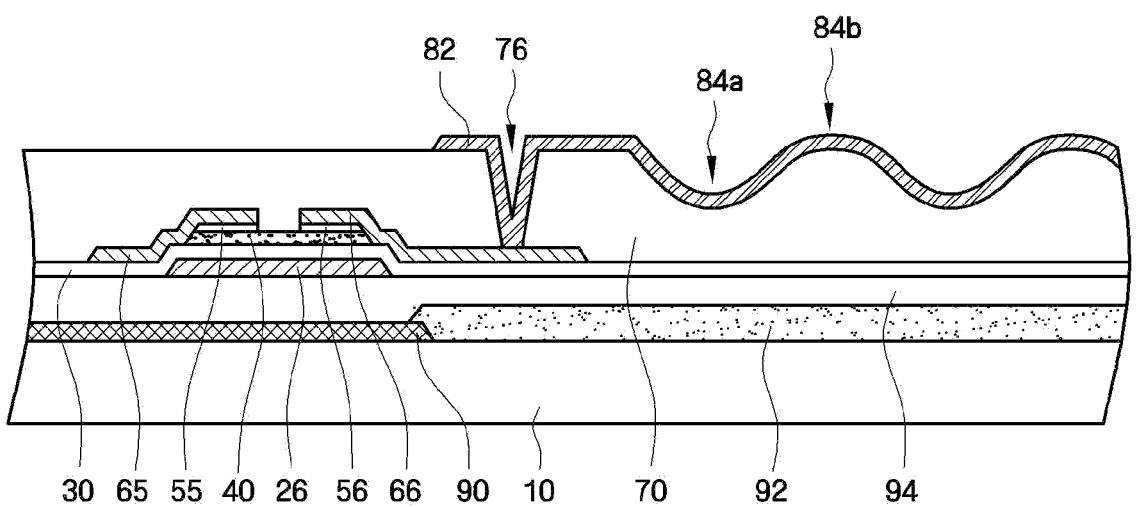

A method of manufacturing the liquid crystal display according to the first exemplary embodiment of the present invention will be described in detail below with reference to FIG. 4A, FIG. 4B, and FIG. 4C. FIG. 4A, FIG. 4B, and FIG. 4C are cross-sectional views showing processes of a method of manufacturing the liquid crystal display according to the first exemplary embodiment of the present invention.

First, referring to FIG. 4A, the black matrix 90, the color filter 92, and the overcoat layer 94 are formed on the first insulating substrate 10. Subsequently, the thin film transistor, which includes the gate electrode 26, the drain electrode 66, the source electrode 65, the semiconductor layer 40, and the ohmic contact layers 55 and 56, is formed. Then, the passivation layer 70 is formed on the thin film transistor.

Referring to FIG. 4B, light is radiated onto the passivation layer 70 through a mask and then developed to form the contact hole 76, the micro-concave portions 84a, and the micro-convex portions 84b on the passivation layer 70. In this case, the passivation layer 70 is completely removed from a region B corresponding to the contact hole 76 so that the drain electrode 66 is exposed. Further, the passivation layer 70 is partially removed from regions C corresponding to the micro-concave portions 84a, so that the micro-concave portions 84a and the micro-convex portions 84b are formed. The passivation layer 70 remains in other regions A.

As described above, various methods may be used to make the thickness of the passivation layer 70 different in different regions. A mask that has the patterns formed in a slit or lattice shape, or a mask having a translucent film is generally used to adjust the amount of light transmitting through the C regions.

In this case, the line width of the pattern between slits or a gap between the patterns, that is, the width of the slit should be smaller than the resolution of an exposer used for exposure. When the translucent film is used, a thin film having a different transmittance or a thin film having a different thickness may be used during the manufacture of the mask in order to adjust the transmittance.

Referring to FIG. 4C, the pixel electrode 82, which is connected to the drain electrode 66 through the contact hole 76, is formed on the passivation layer 70.

A capping layer (not shown) may further be formed between the passivation layer 70 and the pixel electrode 82. In this case, the capping layer functions to separate the pixel electrode 82 from the passivation layer 70. The capping layer may be formed after the passivation layer 70 is patterned. Alternatively, the capping layer and the passivation layer 70 may be patterned simultaneously.

Subsequently, the lower display panel 150 and the upper display panel 160 are aligned and combined with each other as shown in FIG. 2 and the liquid crystal layer 170 is disposed between the panels to complete the liquid crystal display.

Figure 5A:
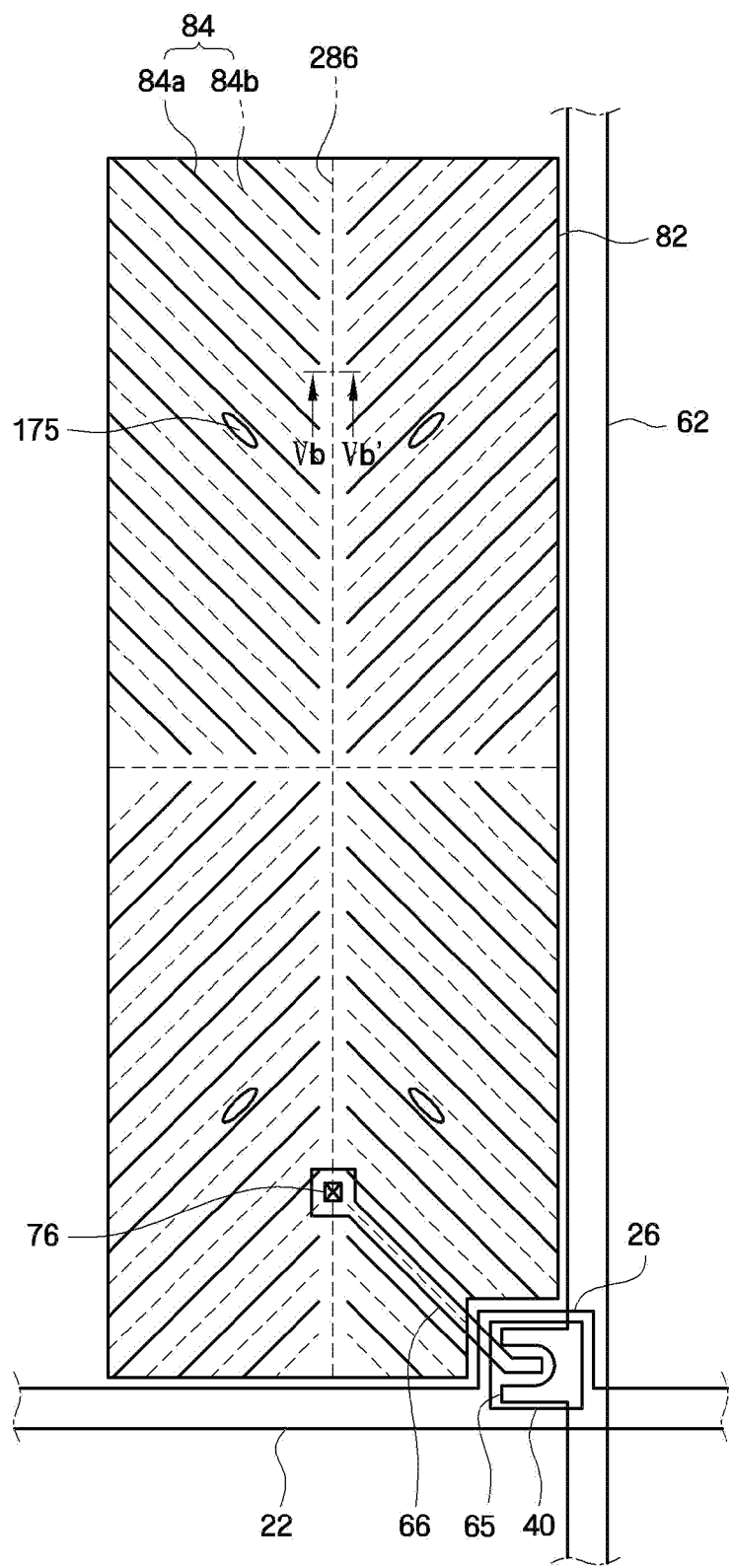
FIG. 5A is a layout of a liquid crystal display according to a second exemplary embodiment of the present invention.
Figure 5B:
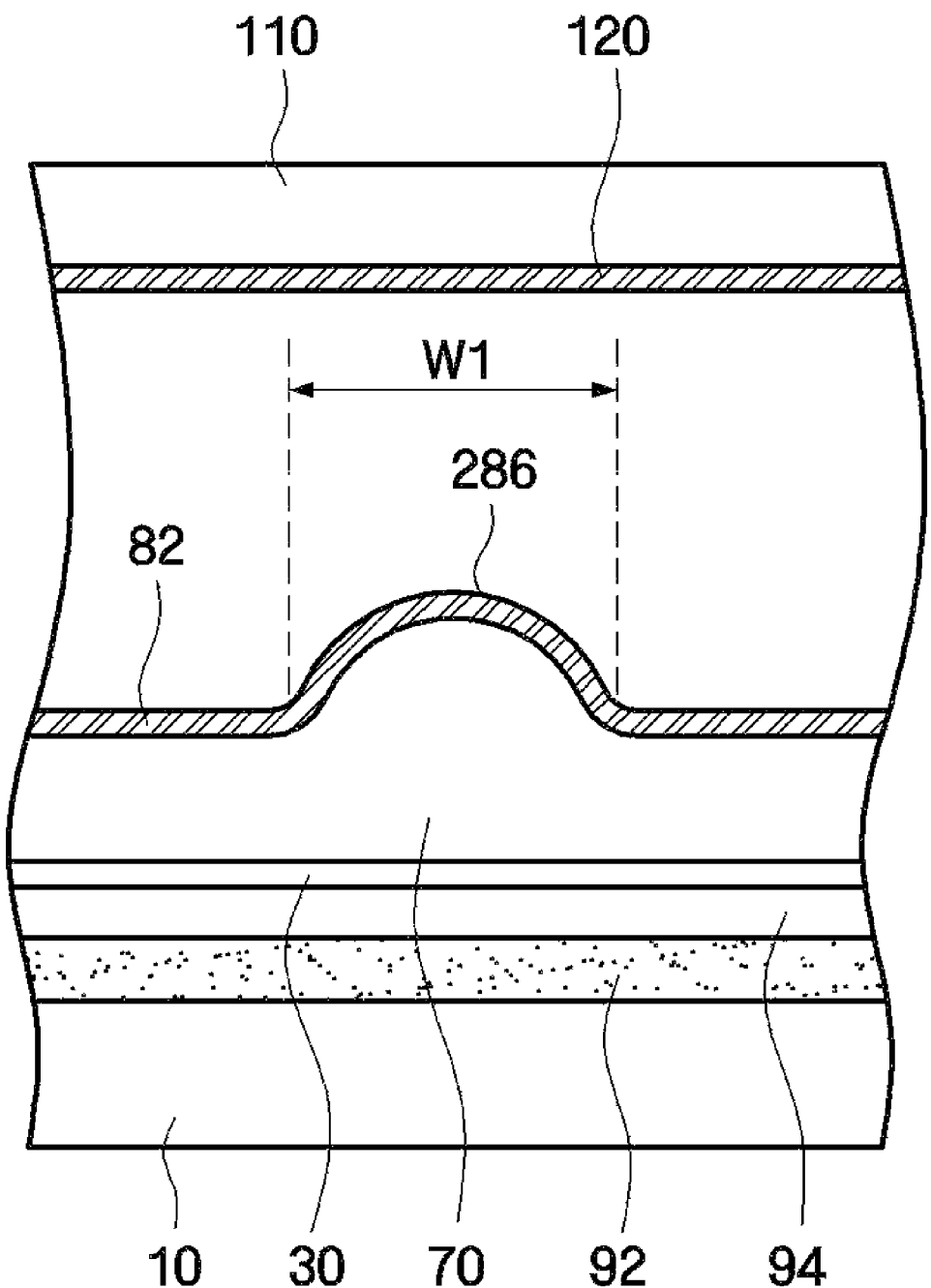
FIG. 5B is a cross-sectional view of the liquid crystal display taken along line Vb-Vb' of FIG. 5A.

A liquid crystal display according to a second exemplary embodiment of the present invention will be described below with reference to FIG. 5A and FIG. 5B. FIG. 5A is a layout of a liquid crystal display according to a second exemplary embodiment of the present invention. FIG. 5B is a cross-sectional view of the liquid crystal display taken along line Vb-Vb' of FIG. 5A. For explanatory convenience, components having the same functions as those shown in the drawings (FIG. 1, FIG. 2, FIG. 3, FIG. 4A, FIG. 4B, and FIG. 4C) of the first exemplary embodiment will be indicated by the same reference numerals, and the description thereof will be omitted. The difference between the first and second exemplary embodiments will be described below.

A pixel electrode 82 includes a cross-shaped connection portion 286 and micro-concave and convex stripes 84. The cross-shaped connection portion 286 divides a pixel region into four domain regions, and the micro-concave and convex stripes 84 are arranged in a specific direction in each domain. In this case, the connection portion 286 protrudes toward a common electrode 120, so that a horizontal electric field may be generated. As described above, liquid crystal molecules 175 are inclined in an extension direction of the micro-concave and convex stripes 84 due to the micro-concave and convex stripes 84. A horizontal electric field generated by the connection portion 286 determines the alignment of the liquid crystal molecules 175, that is, determines whether the liquid crystal molecules 175 are inclined toward one side of the micro-concave and convex stripes 84 or the other side of the micro-concave and convex stripes 84.

The width W1 of the connection portion 286 should be 2.5 times the cell gap or more to effectively control the inclination direction of the liquid crystal molecules by the horizontal electric field generated by the connection portion 286.

Figure 6A:
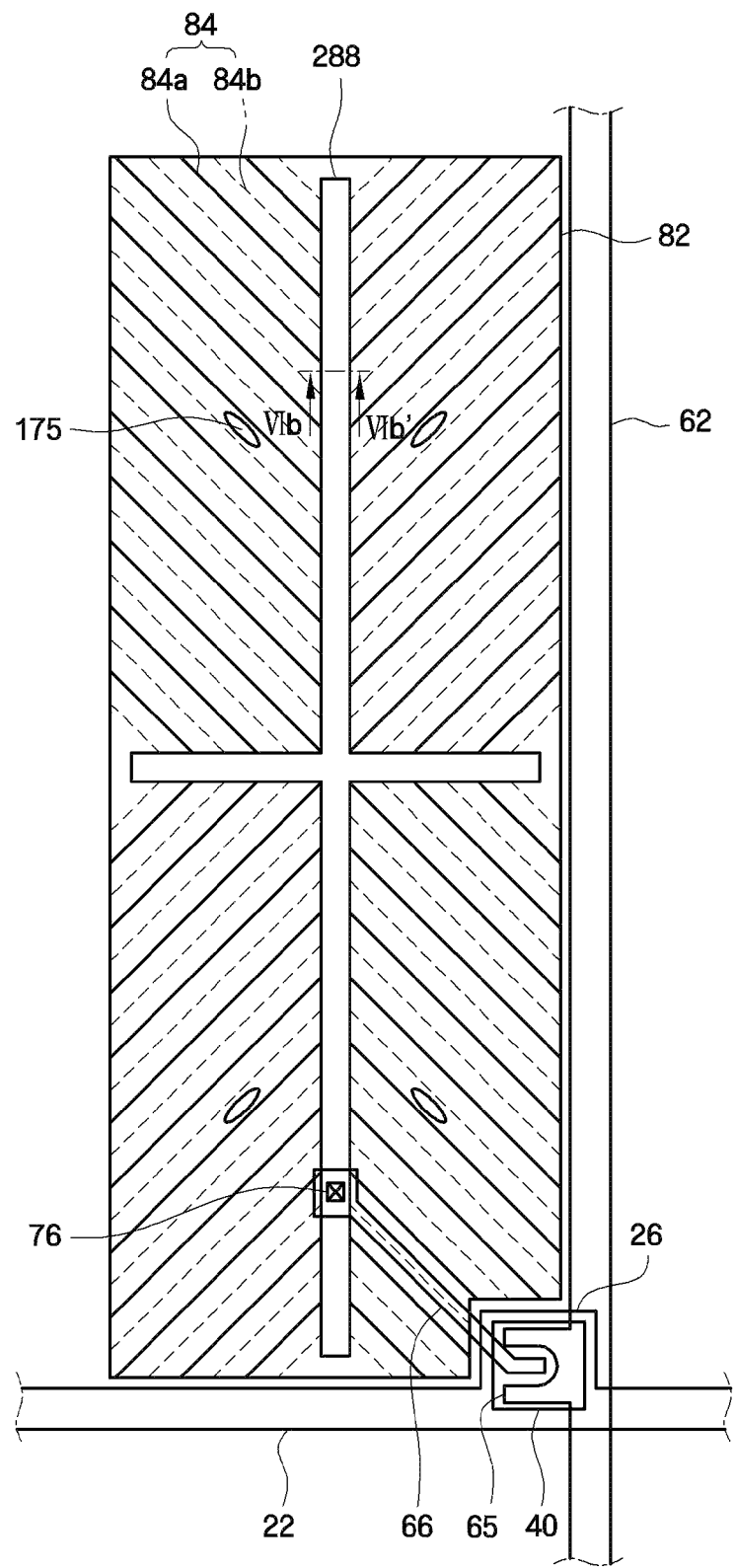
FIG. 6A is a layout of a liquid crystal display according to a third exemplary embodiment of the present invention.
Figure 6B:
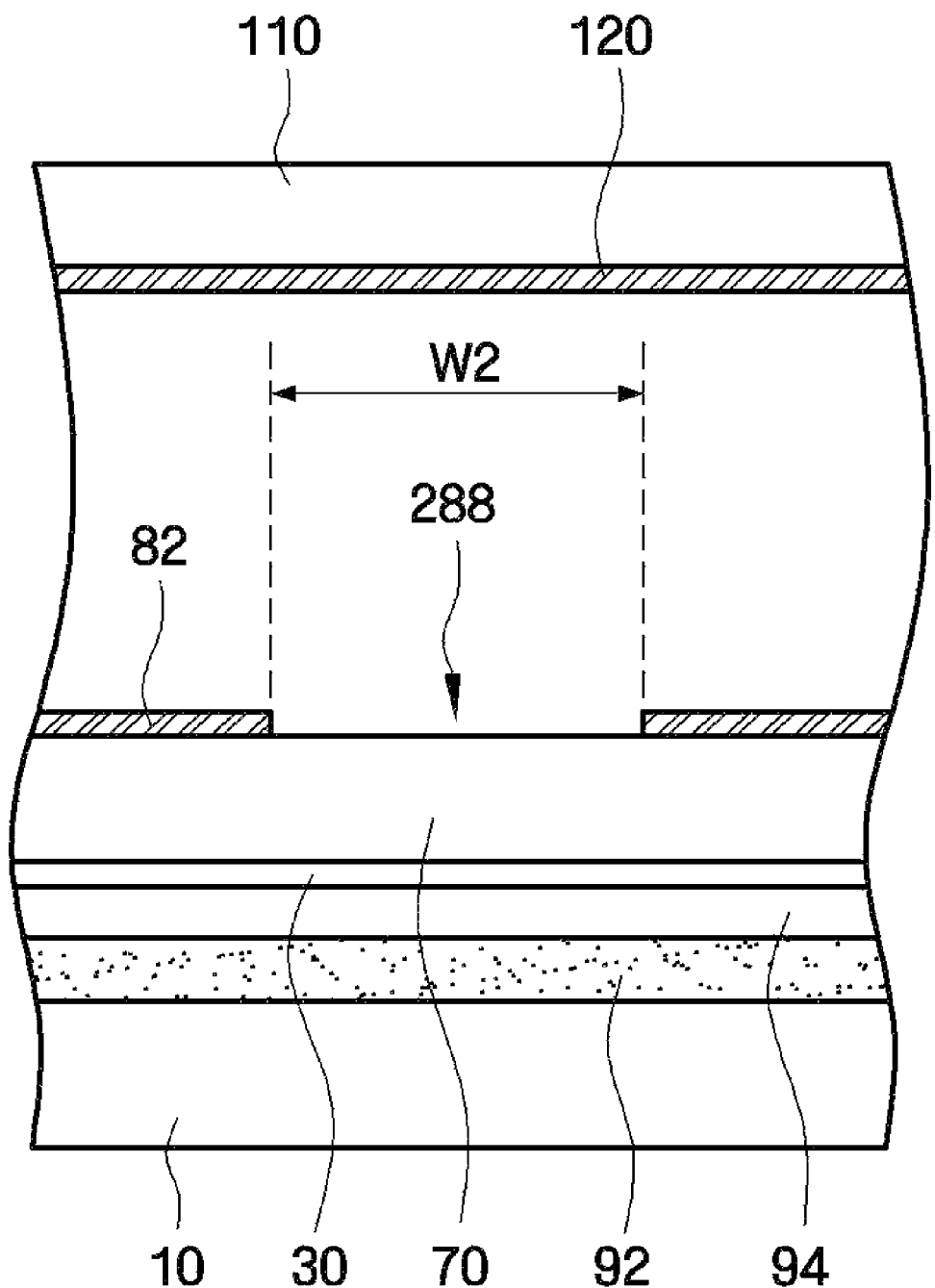
FIG. 6B is a cross-sectional view of the liquid crystal display taken along line VIb-VIb' of FIG. 6A.

A liquid crystal display according to a third exemplary embodiment of the present invention will be described below with reference to FIG. 6A and FIG. 6B. FIG. 6A is a layout of a liquid crystal display according to a third exemplary embodiment of the present invention. FIG. 6B is a cross-sectional view of the liquid crystal display taken along line VIb-VIb' of FIG. 6A. For explanatory convenience, components having the same functions as those shown in the drawings (FIG. 5A and FIG. 5B) of the second exemplary embodiment will be indicated by the same reference numerals, and the description thereof will be omitted. The difference between the second and third exemplary embodiments will be mainly described below.

A pixel electrode 82 includes a cross-shaped cut-out portion 288 and micro-concave and convex stripes 84. The cross-shaped cut-out portion 288 divides a pixel region into four domain regions, and the micro-concave and convex stripes 84 are arranged in a specific direction in each domain. In this case, the cut-out portion 288 is formed by partially removing a part of the pixel electrode from the pixel electrode 82, and generates a horizontal electric field. As described above, liquid crystal molecules 175 are inclined in an extension direction of the micro-concave and convex stripes 84 due to the micro-concave and convex stripes 84. A horizontal electric field generated by the cut-out portion 288 determines the inclination direction of the liquid crystal molecules 175, that is, determines whether the liquid crystal molecules 175 are inclined toward one side of the micro-concave and convex stripes 84 or the other side of the micro-concave and convex stripes 84.

The width W2 of the cut-out portion 288 should be 2.5 times the cell gap or more in order to effectively control the inclination direction of the liquid crystal molecules 175 by the horizontal electric field generated by the cut-out portion 288.

Figure 7:
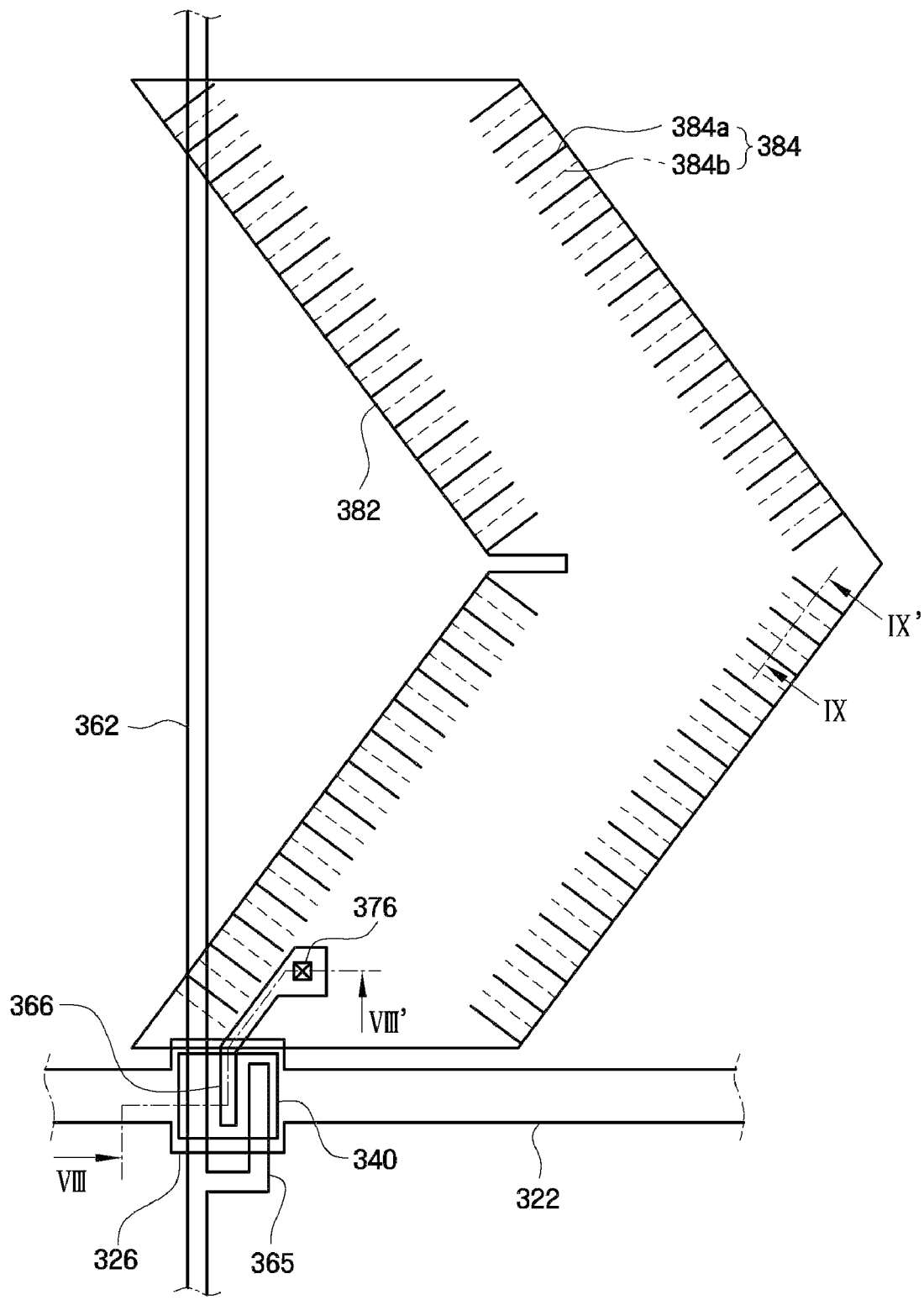
FIG. 7 is a layout of a lower display panel of a liquid crystal display according to a fourth exemplary embodiment of the present invention.
Figure 8:
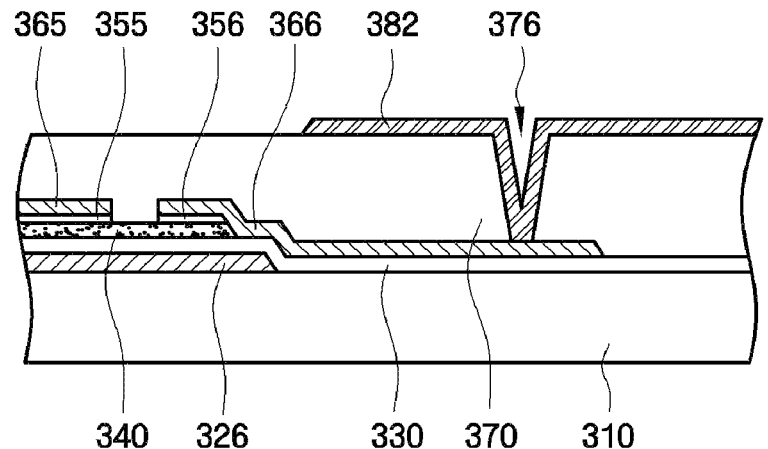
FIG. 8 is a cross-sectional view of the lower display panel taken along line VIII-VIII' of FIG. 7.
Figure 9:
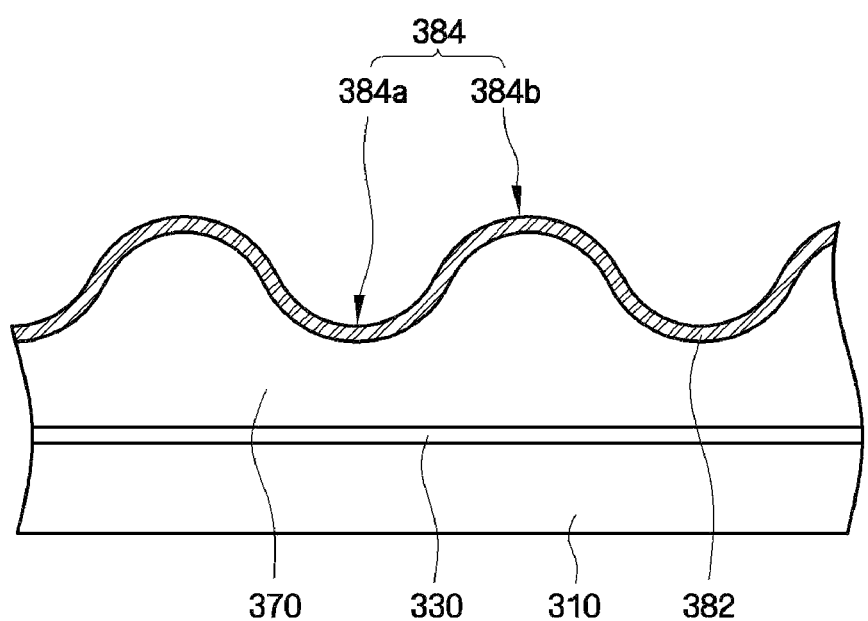
FIG. 9 is a cross-sectional view of the lower display panel taken along line IX-IX' of FIG. 7.
Figure 10:
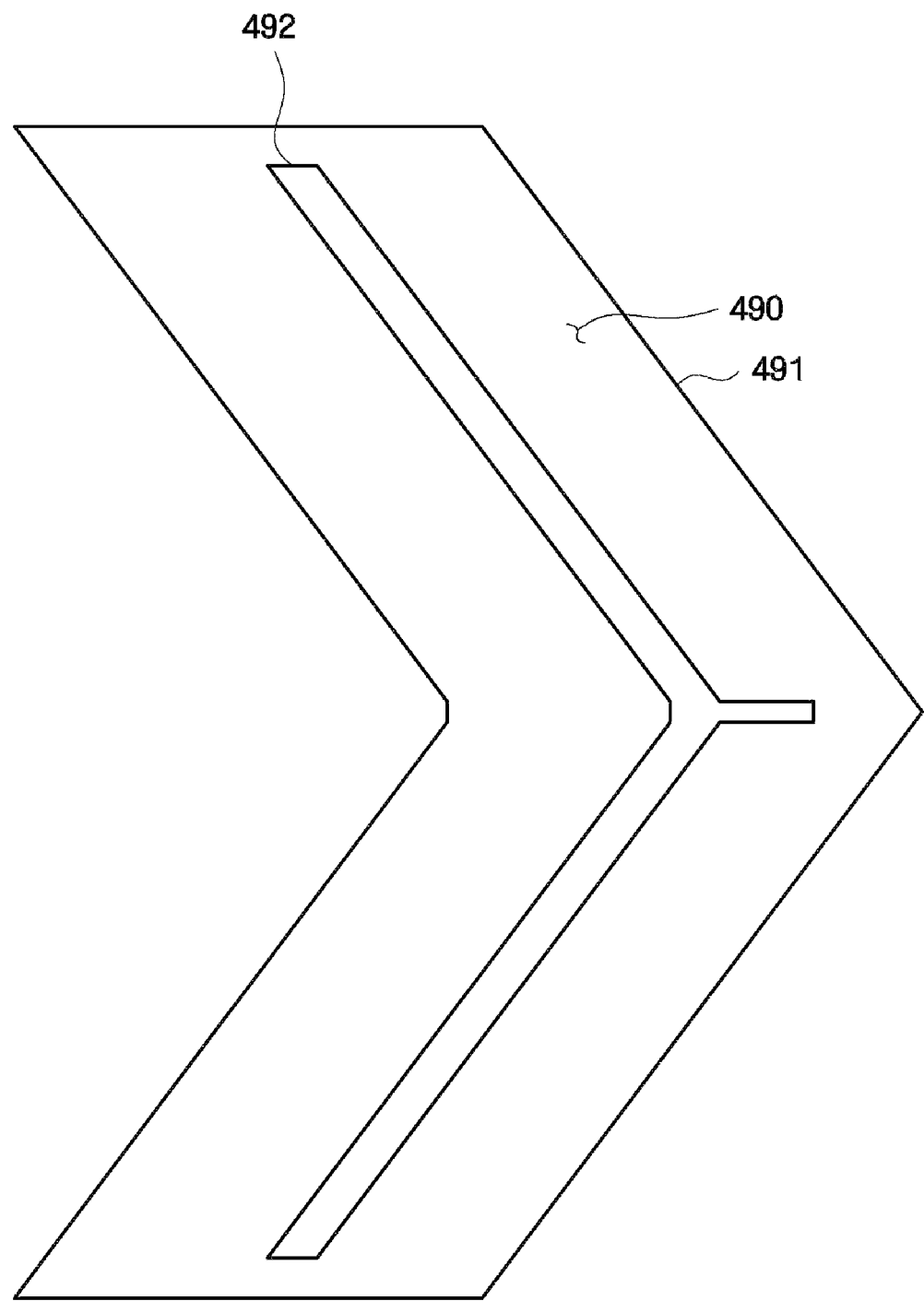
FIG. 10 is a layout of an upper display panel included in the liquid crystal display according to the fourth exemplary embodiment of the present invention.
Figure 11:
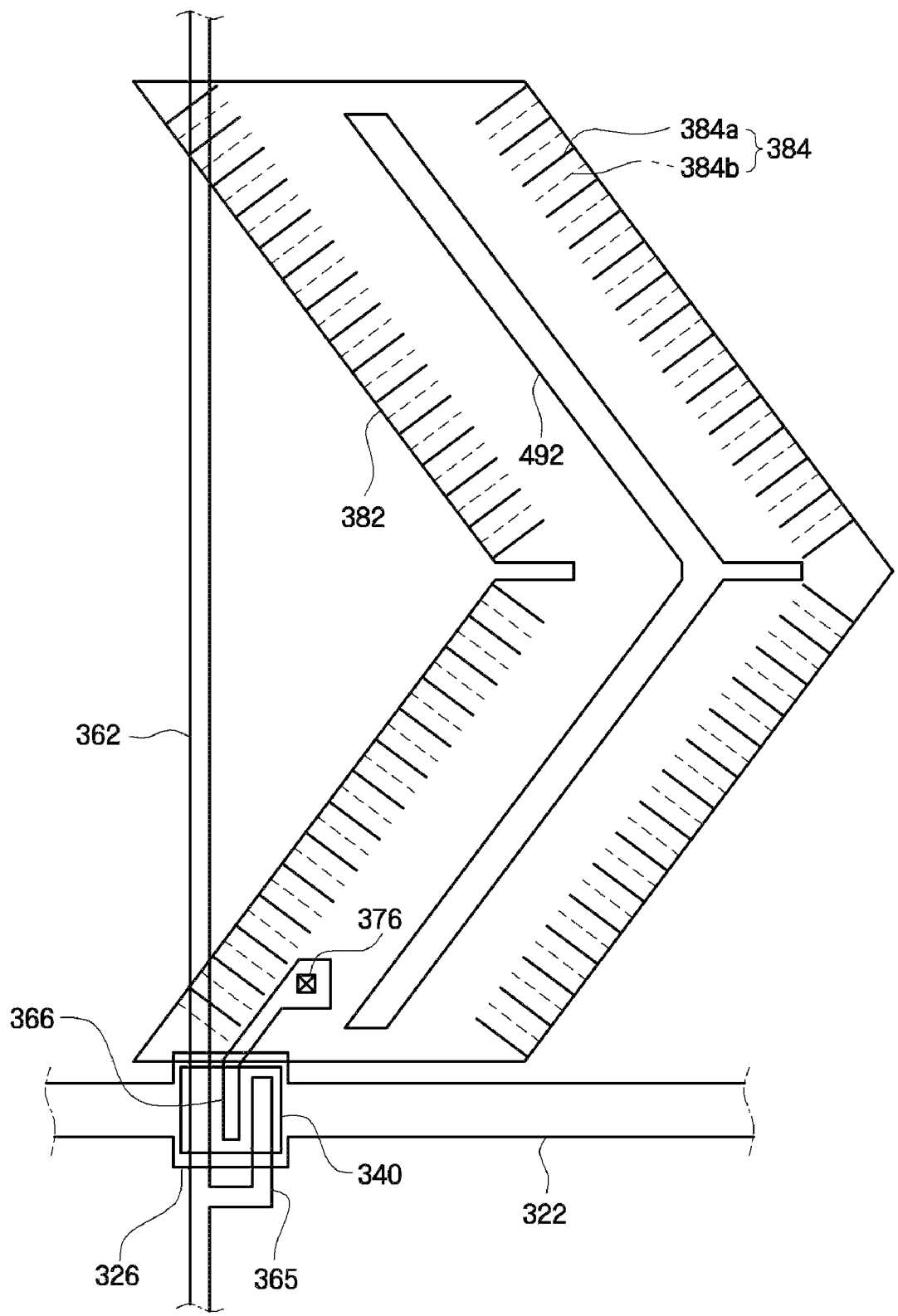
FIG. 11 is a layout of the liquid crystal display that includes the lower display panel of FIG. 7 and the upper display panel of FIG. 10.

A liquid crystal display according to a fourth exemplary embodiment of the present invention will be described below with reference to FIG. 7, FIG. 8, FIG. 9, FIG. 10, and FIG. 1. FIG. 7 is a layout of a lower display panel that includes in a liquid crystal display according to a fourth exemplary embodiment of the present invention. FIG. 8 is a cross-sectional view of the lower display panel taken along line VIII-VIII' of FIG. 7. FIG. 9 is a cross-sectional view of the lower display panel taken along line IX-IX' of FIG. 7. FIG. 10 is a layout of an upper display panel included in the liquid crystal display according to the fourth exemplary embodiment of the present invention. FIG. 11 is a layout of the liquid crystal display that includes the lower display panel of FIG. 7 and the upper display panel of FIG. 10.

A liquid crystal display according to a fourth exemplary embodiment of the present invention includes a lower display panel, an upper display panel, and a liquid crystal layer. The lower display panel includes thin film transistors that are connected to gate lines 322 and data lines 362 and apply data voltages to pixel electrodes 382. The upper display panel faces the lower display panel and includes a common electrode 490. The liquid crystal layer is disposed between the lower display panel and the upper display panel.

The lower display panel will be described in detail below with reference to FIG. 7, FIG. 8, and FIG. 9.

A gate line 322 and a gate electrode 326 are disposed on a first insulating substrate 310, and a gate insulating layer 330 is disposed on the gate line 322 and the gate electrode 326. A semiconductor layer 340 and ohmic contact layers 355 and 356 are disposed on the gate insulating layer 330. A data line 362, a source electrode 365, and a drain electrode 366 are disposed on the ohmic contact layers 355 and 356 and the gate insulating layer 330. A passivation layer 370 is disposed on the data line 362, the source electrode 365, and the drain electrode 366, and the semiconductor layer 340 that is exposed between the source electrode 365 and the drain electrode 366. A contact hole 376 through which the drain electrode 366 is exposed is formed in the passivation layer 370.

The gate line 322, the gate electrode 326, the gate insulating layer 330, the semiconductor layer 340, the ohmic contact layers 355 and 356, the data line 362, the source electrode 365, the drain electrode 366, the passivation layer 370, and the contact hole 376 of this exemplary embodiment may be substantially the same as the gate lines 22, the gate electrode 26, the gate insulating layer 30, the semiconductor layer 40, the ohmic contact layers 55 and 56, the data line 62, the source electrode 65, the drain electrode 66, the passivation layer 70, and the contact hole 76 that are shown in FIG. 1, respectively, in terms of shape and materials thereof.

Micro-concave and convex portions 384 are formed on the regions of the passivation layer 370 that correspond to the edges of the pixel electrode 382.

The pixel electrode 382, which is connected to the drain electrode 366 through the contact hole 376 and positioned on a pixel region, is disposed on the passivation layer 370. In this case, the pixel electrode 82 may be made of a transparent electric conductor such as ITO or IZO, or a reflective electric conductor such as aluminum. The pixel electrode 382 may have a V shape.

Micro-concave and convex stripes 384 are conformally formed at the edges of the pixel electrode 382 to correspond to the micro-concave and convex portions formed on the passivation layer 370.

The pixel electrode 382 has a bent structure that has at least one bent portion. For example, the pixel electrode 382 of this exemplary embodiment has one bent portion, but the present invention is not limited by the number of the bent portions. The pixel electrode 382 is bent at an angle of about 45° or −45° with respect to a polarization axis of a polarizer or the gate line 322.

The micro-concave and convex stripes 384 function to reinforce the horizontal electric field, thereby facilitating the inclination of the liquid crystal molecules of the liquid crystal layer. The micro-concave and convex stripes 384 have a structure in which micro-concave portions 384a and micro-convex portions 384b are alternately arranged. The micro-concave and convex stripes 384 are arranged in a diagonal direction, and extend at an angle of about 45° or −45° with respect to a polarization axis of a polarizer (not shown) or the gate line 322. The micro-concave and convex stripes 384 may extend in a direction substantially orthogonal to the edges of the pixel electrode 382. When driving power is applied to the liquid crystal display, the liquid crystal molecules are inclined in an extension direction of the micro-concave and convex stripes 384. Accordingly, the pixel region is divided into four domain regions.

The micro-concave and convex stripes 384 of this exemplary embodiment may be substantially the same as the micro-concave and convex portions stripes 84 shown in FIG. 1 in terms of structure and functions thereof. That is, the pitch of the micro-concave and convex stripes 384 should be as small as possible and for example, may be 2.5 times the cell gap between the lower display panel and the upper display panel or less, in order to effectively control the movement of the liquid crystal molecules. In addition, if the pitch is 2 μm or more, it may be possible to obtain a horizontal electric field sufficient to control the movement of the liquid crystal molecules. Further, the height difference of the micro-concave and convex stripes 384, that is, the difference in height between the micro-concave portions 384a and the micro-convex portions 384b, should be 0.5 to 1 times the pitch.

A capping layer (not shown) may further be disposed between the passivation layer 370 and the pixel electrode 382. In this case, the capping layer functions to separate the pixel electrode 382 from the passivation layer 370. For example, $SiN_x$ may be used as a material of the capping layer.

The upper display panel facing the lower display panel will be described in detail below with reference to FIG. 10 and FIG. 11.

Black matrices 491, which prevent light from leaking and define pixel regions, are disposed on a second insulating substrate (not shown), which may be made of a transparent insulating material such as glass. Red, green, and blue color filters (not shown) are sequentially arranged on the pixel region between the black matrices 491. An overcoat layer (not shown) may be disposed on the substrate to planarize the black matrices 491 and color. The common electrode 490, which may be made of a transparent conductive material such as ITO or IZO, is disposed on the overcoat layer.

In this case, the common electrode 490 includes a domain-dividing portion 492. The domain-dividing portion faces the pixel electrodes 382 and is inclined at an angle of about 45° or −45° with respect to a polarization axis of a polarizer or the gate line 322. The domain-dividing portion 492 has a bent shape corresponding to the bent shape of the pixel. That is, the domain-dividing portion 492 has a V shape. The domain-dividing portion 492 may be a cut-out portion of the common electrode 490 or a protrusion formed on the common electrode 490. After one pixel is divided into a plurality of domains by the domain-dividing portion 492, the domain-dividing portion 492 may determine the inclination direction of the liquid crystal molecules. Accordingly, the inclination direction of the liquid crystal molecules is diversified by the domain-dividing portion 492, so that it may be possible to increase a reference viewing angle.

In this way, the pixel is divided into a plurality of domains by the domain-dividing portion 492 of the common electrode 490 and the edges of the pixel electrode 382. In this case, the domain of the pixel is divided into left and right pieces by the domain-dividing portion 492, and divided into upper and lower pieces by the bent portion of the pixel electrode 382. That is, the pixel is divided into four domains depending on a direction where main directors of the liquid crystal molecules included in the liquid crystal layer are arranged due to an electric field.

The domain-dividing portion 492 may include notches (not shown) that have the shape of a recessed chamfer. The notches may have a triangular, a rectangular, a trapezoid, or a semi-circular shape. The liquid crystal molecules arranged at domain boundaries may be stably and regularly arranged by the notches. Therefore, it may be possible to prevent display irregularities or residual images from occurring at the domain boundaries.

An alignment layer (not shown) to align the liquid crystal molecules may be disposed on the common electrode 490.

The lower display panel and the upper display panel are aligned and combined with each other as described above and the liquid crystal layer is disposed between the panels to complete the basic structure of the liquid crystal display according to the first exemplary embodiment of the present invention. The liquid crystal display is obtained by disposing elements, such as polarizers and a backlight, on the basic structure. In this case, the polarizers are disposed on both sides of the basic structure, respectively. The polarization axis of one polarizer may be parallel to the gate line 322, and the polarization axis of the other polarizer may be orthogonal to the gate line 322.

When the electric field is not applied between the pixel electrodes 382 and the common electrode 490, the liquid crystal molecules are aligned so that directors of the liquid crystal molecules are perpendicular to the lower display panel and the upper display panel. Further, the liquid crystal molecules may have negative dielectric anisotropy.

Figure 12:
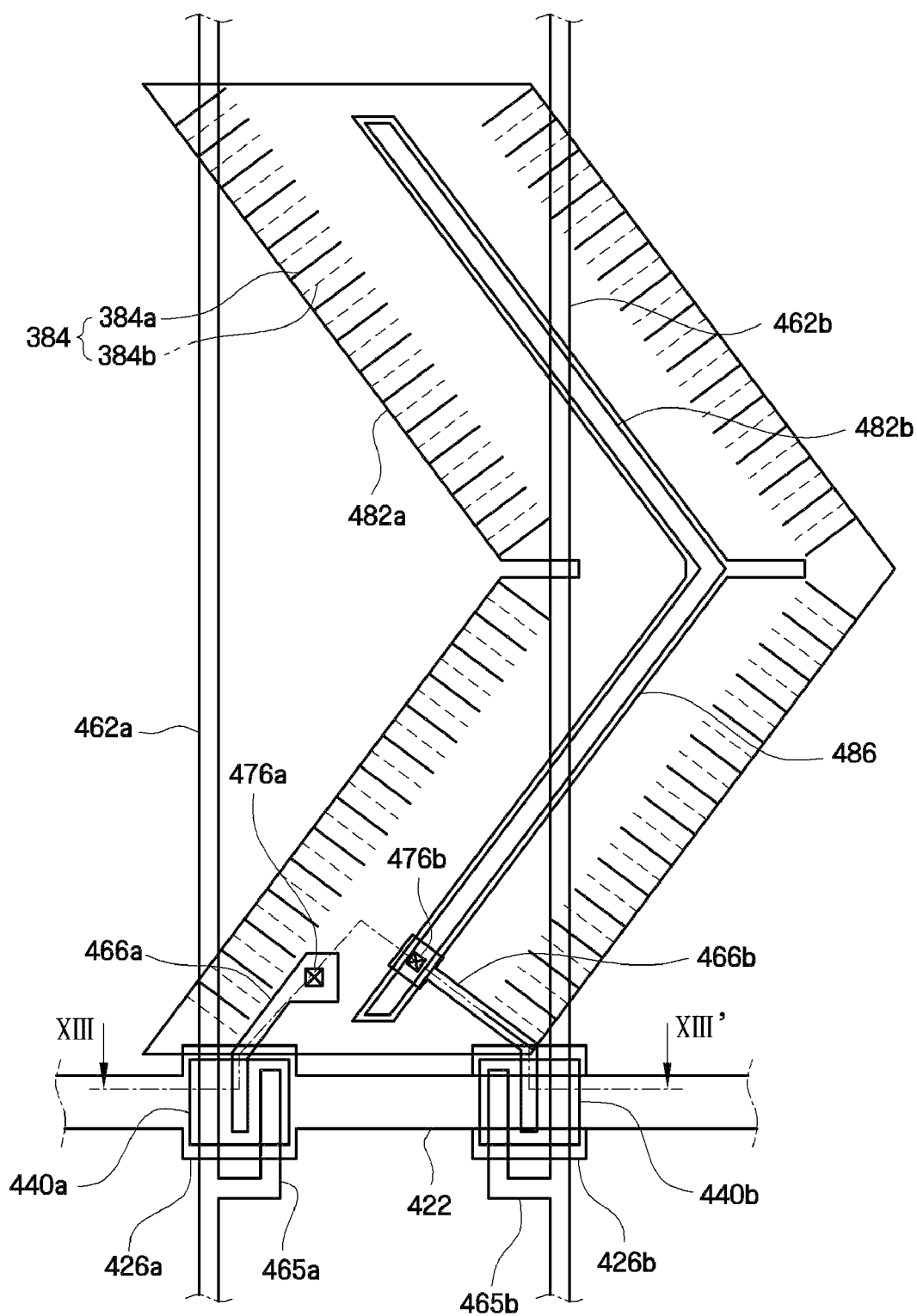
FIG. 12 is a layout of a liquid crystal display according to a fifth exemplary embodiment of the present invention.
Figure 13:
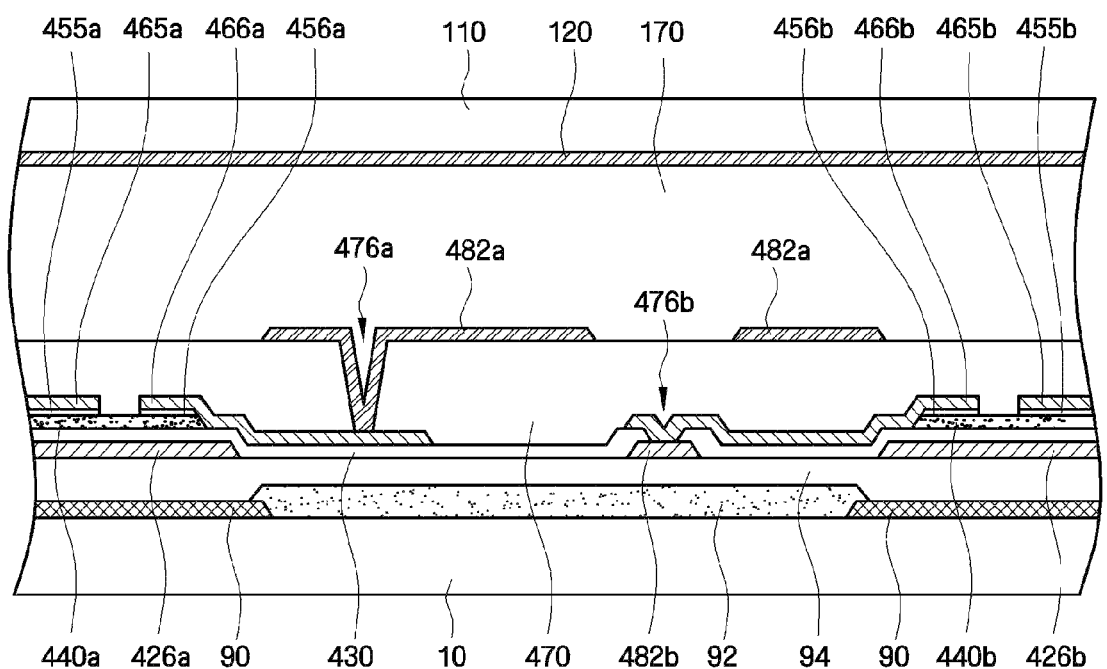
FIG. 13 is a cross-sectional view of the liquid crystal display taken along line XIII-XIII' of FIG. 12.

A liquid crystal display according to a fifth exemplary embodiment of the present invention will be described below with reference to FIG. 12 and FIG. 13. FIG. 12 is a layout of a liquid crystal display according to a fifth exemplary embodiment of the present invention. FIG. 13 is a cross-sectional view of the liquid crystal display taken along line XIII-XIII' of FIG. 12.

Referring to FIG. 12 and FIG. 13, the liquid crystal display according to the fifth exemplary embodiment of the present invention includes a lower display panel, an upper display panel, and a liquid crystal layer. The lower display panel includes thin film transistors that are connected to gate lines 422, first data lines 462a, and second data lines 462b and apply data voltages to pixel electrodes 482a. The upper display panel faces the lower display panel and includes a common electrode 120. The liquid crystal layer is interposed between the lower display panel and the upper display panel. According to the present exemplary embodiment, color filters 92 and a thin film transistor array are disposed in the lower display panel, and the present exemplary embodiment will be described by using AOC structure where the thin film transistor array is disposed on the color filters 92. However, the present invention is not limited thereto. That is, exemplary embodiments of the present invention also may employ COA structure a thin film transistor array are disposed on a lower display panel and the color filters are disposed on the thin film transistor array. In this case, the color filter may be used as a passivation layer that is provided between the thin film transistor array and pixel electrodes. Furthermore, the color filters may be disposed on the upper display panel. For explanatory convenience, exemplary embodiments of the present invention will be described below using a liquid crystal display having the AOC structure.

The lower display panel is described in detail below.

Black matrices 90 are disposed on a first insulating substrate 10, which may be made of a transparent insulating material such as glass. Red, green, and blue color filters 92 are sequentially arranged on the pixel region between the black matrices 90. An overcoat layer 94 may be disposed on the substrate to planarize the black matrices 90 and the color filters 92.

The gate line 422 through which a gate signal is transmitted is disposed on the overcoat layer 94 in a first direction, for example, in a horizontal direction. A pair of (first and second) gate electrodes 426a and 426b extends from the gate line 22. The gate line 422 and the first and second gate electrodes 426a and 426b are referred to as gate wires.

Further, control electrodes 482b, which divide the pixel region into a plurality of domains, are disposed on the overcoat layer 94. The control electrode 482b is positioned at the central portion of the pixel electrode 482a and has a bent shape, for example, a V-shape. Although shown in FIG. 13 as being formed on the same layer as the gate wires, the control electrode 482b may alternatively be disposed on the same layer as the pixel electrode 482a or the data lines 462a and 462b, and may be made of the same material as the pixel electrode 482a or the data lines 462a and 462b.

A storage line (not shown), which crosses the pixel region and extends in the horizontal direction so as to be substantially parallel to the gate line 422, may be disposed on the overcoat layer 94. The storage line overlaps the pixel electrode 482a, thereby forming a storage capacitor that may store charge.

Each gate wire 422, 426a, and 426b and the control electrodes 482b may be made of an aluminum-based metal, such as aluminum (Al) or an aluminum alloy, a silver-based metal, such as silver (Ag) or a silver alloy, a copper-based metal, such as copper (Cu) or a copper alloy, a molybdenum-based metal, such as molybdenum (Mo) or a molybdenum alloy, chromium (Cr), titanium (Ti), or tantalum (Ta). In addition, each gate wires 422, 426a, and 426b and the control electrodes 482b may have a multilayer structure that includes two conductive films (not shown) having different physical properties. One conductive film of the two conductive films may be made of a metal having low resistivity, for example, an aluminum-based metal, a silver-based metal, or a copper-based metal, to reduce signal delay or voltage drop in each gate wire 422, 426a, and 426b and the control electrode 482b. The other conductive film may be made of a material having excellent contact characteristics with respect to ITO and IZO, for example, a molybdenum-based metal, chromium, titanium, or tantalum. A structure that has a chromium lower film and an aluminum upper film, and a structure that has an aluminum lower film and a molybdenum upper film may be used as an example of the combination of the two conductive films. However, each gate wire 422, 426a, and 426b and the control electrodes 482b may be made of various metallic materials or conductors other than the above metallic materials.

A gate insulating layer 430 made of silicon nitride ($SiN_x$) is disposed on the gate wires 422, 426a, and 426b, and the control electrode 482b.

A pair of (first and second) semiconductor layers 440a and 440b, which may be made of hydrogenated amorphous silicon or polysilicon, is disposed on the gate insulating film 430. The first and second semiconductor layers 440a and 440b may have various shapes, such as an island shape and a stripe shape. For example, like in this exemplary embodiment, the semiconductor layers 440a and 440b may each have an island shape.

Ohmic contact layers 455a, 455b, 456a, and 456b are disposed on each semiconductor layer 440a and 440b, and may be made of silicide or n+hydrogenated amorphous silicon in which n-type impurities are doped at high concentration. The ohmic contact layers 455a, 455b, 456a, and 456b are positioned in pairs on the semiconductor layers 440a and 440b.

A pair of (first and second) data lines 462a and 462b and a pair of (first and second) drain electrodes 466a and 466b are disposed on the ohmic contact layers 455a, 455b, 456a, and 456b and the gate insulating layer 430. The drain electrodes 466a and 466b correspond to the first and second data lines 462a and 462b, respectively.

The first and second data lines 462a and 462b extend in a vertical direction to cross the gate line 422. The first and second data lines 462a and 462b transmit a data voltage and a control voltage. The first and second data lines 462a and 462b are provided with first and second source electrodes 465a and 465b that extend toward the first and second drain electrodes 466a and 466b, respectively. As shown in FIG. 12, the first data line 462a transmits a data signal to the pixel electrode 482a, and the second data line 462b transmits a control signal to the control electrode 482b.

A contact hole 476b is formed in the gate insulating layer 430. The second drain electrode 466b is connected to the control electrode 482b through the contact hole 476b, so that a control voltage may be applied to the control electrode 482b.

The first and second data lines 462a and 462b, the first and second source electrodes 465a and 465b, and the first and second drain electrodes 466a and 466b are referred to as data wires.

Each data wire 462a, 462b, 465a, 465b, 466a, and 466b may be made of a refractory metal, such as chromium, molybdenum-based metal, tantalum, or titanium. Further, each data wire 462a, 462b, 465a, 465b, 466a, and 466b may have a multilayer structure in which an upper film (not shown), which may be made of a low-resistance material, is formed on a lower film (not shown), which may be made of a refractory metal or the like. A three-layer structure that has a molybdenum film, an aluminum film, and a molybdenum film may be used as an example of the multilayer structure other than the above-mentioned dual-layer structures that have a chromium lower film and an aluminum upper film, or the above mentioned dual-layer structure that has an aluminum lower film and a molybdenum upper film.

At least a part of the first and second source electrodes 465a and 465b overlap the semiconductor layers 440a and 440b, respectively. Further, the first and second drain electrodes 466a and 466b face the first and second source electrodes 465a and 465b with the gate electrodes 426a and 426b therebetween, and at least a part of the drain electrodes overlap the semiconductor layers 440a and 440b, respectively. In this case, the above-mentioned ohmic contact layers 455a, 455b, 456a, and 456b are disposed between the semiconductor layers 440a and 440b and the first and second source electrodes 465a and 465b, and between the semiconductor layers 440a and 440b and the first and second drain electrodes 466a and 466b, respectively, to reduce the contact resistance therebetween.

A passivation layer 470 is disposed on the data wires 462a, 462b, 465a, 465b, 466a, and 466b and the semiconductor layers 440a and 440b exposed through the data wires. In this case, the passivation layer 470, which may be made of an inorganic material such as silicon nitride or silicon oxide, an organic material that has a good planarizing characteristic and photosensitivity, or an insulating material having a low dielectric constant such as a-Si:C:O or a-Si:O:F that is formed by plasma enhanced chemical vapor deposition (PECVD). In addition, the passivation layer 470 may have a dual-layer structure, which includes a lower inorganic layer and an upper organic layer, to improve characteristics of the organic film and to protect the exposed semiconductor layers 440a and 440b. In addition, red, green, and blue color filter layers may be used as the passivation layer 470.

A contact hole 476a is formed in the passivation layer 470, and micro-concave and convex portions are formed on regions of the passivation layer 470 that correspond to the edges of the pixel electrode 482a.

The pixel electrode 482a disposed on the passivation layer 470 is connected to the first drain electrode 466a through the contact hole 476a, so that a data voltage may be applied to the pixel electrode 482a. The micro-concave and convex stripes 384, which are conformally formed to correspond to the micro-concave and convex portions formed on the passivation layer 470, are arranged at the edges of the pixel electrode 482a. In this case, the micro-concave and convex stripes 384 function to reinforce the horizontal electric field, thereby facilitating the inclination of the liquid crystal molecules of the liquid crystal layer. The micro-concave and convex stripes 384 have a structure where micro-concave portions 384a and micro-convex portions 384b are alternately arranged. The micro-concave and convex stripes 384 are arranged in a diagonal direction and extend at an angle of about 45° or −45° with respect to a polarization axis of a polarizer (not shown) or the gate line 422. The micro-concave and convex stripes 384 may extend in a direction substantially orthogonal to the edges of the pixel electrode 482a. When driving power is applied to the liquid crystal display, the liquid crystal molecules are inclined in an extension direction of the micro-concave and convex stripes 384. Accordingly, the pixel region is divided into four domain regions.

The pixel electrode 482a, to which a data voltage is applied, generates an electric field together with the common electrode 120 of the upper display panel, thereby determining the arrangement of the liquid crystal molecules that are provided between the pixel electrode 482a and the common electrode 120. The pixel electrode 482a may be made of a transparent electric conductor such as ITO or IZO, or a reflective electric conductor such as aluminum.

The pixel electrode 482 includes a cut-out portion 486 that is inclined at an angle of about 45° or −45° with respect to the gate line 422 or a polarization axis of a polarizer. The cut-out portion 486 may have a bent shape corresponding to the bent shape of the pixel. That is, the cut-out portion 486 may be V-shaped.

The control electrode 482b is disposed to overlap with the cut-out portion 486. The control electrode 482b may be narrower than the cut-out portion 486, and the control electrode 482b may be disposed in the cut-out portion 486.

A control voltage applied to the control electrode 482b should be slightly higher than a data voltage applied to the pixel electrode 482a. In this case, the level of the voltage means the magnitude of the voltage relative to the common voltage. If a control voltage higher than a data voltage is applied to the control electrode 482b, an equipotential line of the liquid crystal layer is convex toward the common electrode 120 in the vicinity of the control electrode 482b. Accordingly, the liquid crystal molecules are inclined in a direction perpendicular to the direction of the electric field. For this reason, the liquid crystal molecules provided on both sides of the control electrode 482b are inclined toward the control electrode 482b. Therefore, the domain of the pixel region is divided by the control electrode 482b.

An alignment film (not shown) to align the liquid crystal layer may be disposed on the pixel electrode 482a and the passivation layer 470.

The upper display panel facing the lower display panel is described in detail below.

A second insulating substrate 110, which may be made of a transparent insulating material such as glass, is disposed to face the first insulating substrate 10. The common electrode 120, which may be made of a transparent conductive material such as ITO or IZO, is disposed on the second insulating substrate 110. An alignment layer (not shown) to align the liquid crystal layer 170 may be disposed on the common electrode 120. Since a separate patterning process is not added for the common electrode 120, it may be possible to improve the transmittance of the liquid crystal display and to reduce the manufacturing costs.

The lower display panel and the upper display panel are aligned and combined with each other as described above and the liquid crystal layer 170 is disposed between the panels to complete the basic structure of the liquid crystal display according to the fifth exemplary embodiment of the present invention. The liquid crystal display is obtained by disposing elements, such as polarizers and a backlight, on the basic structure. In this case, the polarizers are disposed on both sides of the basic structure, respectively. The polarization axis of one polarizer may be parallel to the gate line 422, and the polarization axis of the other polarizer may be orthogonal to the gate line 422.

When the electric field is not applied between the pixel electrodes 482a and the common electrode 120, the liquid crystal molecules included in the liquid crystal layer 170 are aligned so that directors of the liquid crystal molecules are perpendicular to the lower display panel and the upper display panel. Further, the liquid crystal molecules may have negative dielectric anisotropy.

In the liquid crystal display according to the exemplary embodiment of the present invention, micro-concave and convex stripes are formed on a pixel electrode as described above. Therefore, it may be possible to effectively control the movement of the liquid crystal molecules. As a result, it may be possible to improve the response speed and luminance of the liquid crystal display.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display, comprising:
   a first insulating substrate;
   pixel electrodes disposed on the first insulating substrate and divided into a plurality of domains, each domain comprising micro-concave stripes and micro-convex stripes arranged in a specific direction;
   a second insulating substrate facing the first insulating substrate;
   a common electrode, which is not patterned, disposed on the second insulating substrate; and
   a liquid crystal layer disposed between the first insulating substrate and the second insulating substrate, the liquid crystal layer comprising liquid crystal molecules, the liquid crystal molecules being aligned perpendicular to the first insulating substrate and the second insulating substrates when an electric field is not applied to the liquid crystal layer,
   wherein the liquid crystal molecules are inclined in an extension direction of the micro-concave and convex stripes when an electric field is applied to the liquid crystal layer.

2. The liquid crystal display of claim 1, wherein the pitch of the micro-concave stripes and the micro-convex stripes is not greater than 2.5 times a cell gap between the first insulating substrate and the second insulating substrate.

3. The liquid crystal display of claim 2, wherein a difference in height between the micro-concave stripes and the micro-convex stripes is 0.5 to 1 times the pitch.

4. The liquid crystal display of claim 1, further comprising:
   a first polarizer disposed on the first insulating substrate; and
   a second polarizer disposed on the second insulating substrate,
   wherein the micro-concave stripes and the micro-convex stripes extend at an angle of 45° or −45° with respect to a polarization axis of the polarizers.

5. The liquid crystal display of claim 1, further comprising:
   a capping layer disposed between the first insulating substrate and the pixel electrodes, the capping layer contacting the pixel electrodes.

6. The liquid crystal display of claim 1, wherein each pixel electrode further comprises a connection portion that divides the pixel electrode into a plurality of domains, and
   the connection portion protrudes toward the common electrode.

7. The liquid crystal display of claim 6, wherein a width of the connection portion is at least 2.5 times a cell gap between the first insulating substrate and the second insulating substrate.

8. The liquid crystal display of claim 1, wherein each pixel electrode further comprises a cut-out portion that divides the pixel electrode into the plurality of domains.

9. The liquid crystal display of claim 8, wherein a width of the cut-out portion is at least 2.5 times a cell gap between the first insulating substrate and the second insulating substrate.

10. A liquid crystal display, comprising:
    a first insulating substrate;
    pixel electrodes disposed on the first insulating substrate, having a bent structure, and comprising micro-concave stripes and micro-convex stripes that extend along edges of the pixel electrode to be orthogonal to the edges of the pixel electrode;
    a second insulating substrate facing the first insulating substrate;
    a common electrode disposed on the second insulating substrate and comprising a domain-dividing portion; and
    a liquid crystal layer disposed between the first insulating substrate and the second insulating substrate and comprising liquid crystal molecules, the liquid crystal molecules being aligned perpendicular to the first insulating substrate and the second insulating substrate when an electric field is not applied to the liquid crystal layer,
    wherein the liquid crystal molecules are inclined in an extension direction of the micro-concave stripes and the micro-convex stripes when an electric field is applied to the liquid crystal layer.

11. The liquid crystal display of claim 10 wherein a pitch of the micro-concave stripes and the micro-convex stripes is not greater than 2.5 times a cell gap between the first insulating substrate and the second insulating substrate.

12. The liquid crystal display of claim 11, wherein a difference in height between the micro-concave stripes and the micro-convex stripes is 0.5 to 1 times the pitch.

13. The liquid crystal display of claim 10, further comprising:
    a first polarizer disposed on the first insulating substrate; and
    a second polarizer disposed on the second insulating substrate,
    wherein the micro-concave stripes and the micro-convex stripes extend at an angle of 45° or −45° with respect to a polarization axis of the polarizers.

14. The liquid crystal display of claim 10, further comprising:
    a capping layer disposed between the first insulating substrate and the pixel electrodes, the capping layer contacting the pixel electrodes.

15. A liquid crystal display, comprising:
    a first insulating substrate;
    pixel electrodes disposed on the first insulating substrate, having a bent structure, and comprising micro-concave stripes and micro-convex stripes that extend along edges of the pixel electrode to be orthogonal to the edges of the pixel electrode;
    control electrodes overlapping with cut-out portions in the pixel electrodes, the control electrodes receiving a voltage higher than that applied to the pixel electrodes;
    a second insulating substrate facing the first insulating substrate;
    a common electrode, which is not patterned, disposed on the second insulating substrate; and
    a liquid crystal layer disposed between the first insulating substrate and the second insulating substrate, the liquid crystal layer comprising liquid crystal molecules, the liquid crystal molecules being aligned perpendicular to the first insulating substrate and the second insulating substrate when an electric field is not applied to the liquid crystal layer,
    wherein the liquid crystal molecules are inclined in an extension direction of the micro-concave stripes and the micro-convex stripes when an electric field is applied to the liquid crystal layer.

16. The liquid crystal display of claim 15, wherein a pitch of the micro-concave stripes and the micro-convex stripes is not greater than 2.5 times a cell gap between the first insulating substrate and the second insulating substrate.

17. The liquid crystal display of claim 16, wherein a difference in height between the micro-concave stripes and the micro-convex stripes is 0.5 to 1 times the pitch.

18. The liquid crystal display of claim 15, further comprising:
a first polarizer disposed on the first insulating substrate; and
a second polarizer disposed on the second insulating substrate,
wherein the micro-concave stripes and the micro-convex stripes extend at an angle of 45° or −45° with respect to a polarization axis of the polarizers.

19. The liquid crystal display of claim 15, further comprising:
a capping layer disposed between the first insulating substrate and the pixel electrodes, the capping layer contacting the pixel electrodes.

20. The liquid crystal display of claim 15, further comprising:
gate lines disposed on the first insulating substrate; and
first data lines and second data lines crossing the gate lines,
wherein data voltages are applied to the pixel electrodes from the first data lines, and
control voltages are applied to the control electrodes from the second data lines.

* * * * *